United States Patent
Mulder

[11] 3,987,299
[45] Oct. 19, 1976

[54] METHOD AND APPARATUS FOR FORMING COLOR IMAGES USING AN IMAGE INTENSIFIER TUBE

[75] Inventor: Hendrik Mulder, Delft, Netherlands

[73] Assignee: N.V. Optische Industrie de Oude Delft, Netherlands

[22] Filed: May 27, 1975

[21] Appl. No.: 581,021

[30] Foreign Application Priority Data
May 30, 1974 Netherlands.................... 7407285

[52] U.S. Cl............................ 250/213 VT; 250/226; 350/169; 350/172
[51] Int. Cl.² ........................................ H01J 31/56
[58] Field of Search ......... 250/213 R, 213 VT, 226; 356/173; 350/132, 169, 172

[56] References Cited
UNITED STATES PATENTS

| | | | |
|---|---|---|---|
| 2,200,467 | 5/1940 | Cristiani.......................... | 250/226 X |
| 2,410,115 | 10/1946 | Varian ............................ | 250/226 X |
| 3,231,746 | 1/1966 | Goodrich...................... | 250/213 VT |

Primary Examiner—Eugene La Roche
Attorney, Agent, or Firm—Marn & Jangarathis

[57] ABSTRACT

The radiation spectrum from a scene is split according to two wavelength regions to provide two spaced images of the same scene, each from the radiation of a different one of said regions, on the cathode of an image intensifier tube. The images are intensified by means of a desired number of image intensifier tubes and the images thus produced on the anode of the last tube are recombined each in an added different color.

14 Claims, 12 Drawing Figures

METHOD AND APPARATUS FOR FORMING COLOR IMAGES USING AN IMAGE INTENSIFIER TUBE

This invention relates to a method of, and apparatus for the formation of colour images.

The invention provides a method and apparatus which make it possible to distinguish between colours which, generally speaking, cannot be distinguished from each other either because, owing to circumstances, the distinction cannot be made with the human eye, or because the human eye is insensitive to the colour(s) concerned. For example, in daylight, in dusk, let alone in darkness, the eye cannot distinguish between various kinds of green, such as natural green (chlorophyl) and artificial green. An important aspect in this connection is that chlorophyl not only reflects in the green range of the spectrum, but, unlike artificial green, its spectral reflection also shows a peak in the near infrared, to which, however, the human eye is insensitive.

The present invention provides a method by which, under such conditions, a very good distinction can be made without additional sources of light being needed.

By means of the method and apparatus according to the present invention it is also possible, for example, to distinguish between diseased and healthy trees. In general, the invention can be used for distinguishing between colours which normally cannot be distinguished by the human eye.

The method according to the present invention is characterized by splitting the radiation spectrum from a scene according to a number of wavelength regions, forming on the cathode of a single image intensifier tube separate images of the scene from the radiation of each wavelength region so that said images are spatially separated; intensifying the cathode images, in a manner known per se, by means of one or more image intensifier tubes; and effecting superimposition of the intensified separate images thus produced on the last anode, each image in its own colour.

In order to prevent poor registry in the ultimate image as a result of distortion as much as possible, the various images are preferably spatially separated so that corresponding points on the cathode(s) and anode(s) are spaced equal radial distances from the electro-optical axis, because in that case it is only the non-rotation-symmetrical distortion which affects image registry.

If there is little rotation-symmetrical distortion, the images can of course be formed in side-by-side relationship, so that they are just shifted relatively to each other.

As stated above, the invention also relates to apparatus for colour image formation by means of the above method.

The apparatus according to the invention is characterized by means for depicting a scene in a plane, comprising a colour splitting system for splitting the radiation spectrum from the scene into separate wavelength regions so as to form in said plane an image for each wavelength region spatially separated from the other images; at least one image intensifier tube comprising a cathode and an anode said cathode being disposed so that its surface coincides with said plane; means for making each image perceivable in a colour of its own; and means posterior to said anode for effecting superimposition of the individual images to form one image.

Further characteristics of the invention will become apparent from the following description read with reference to the accompanying diagrammatic drawings. In said drawings, FIG. 1 shows an image of a flag and a tree, formed on the cathode of an image intensifying tube after being split according to two wavelength regions;

Figure 5:
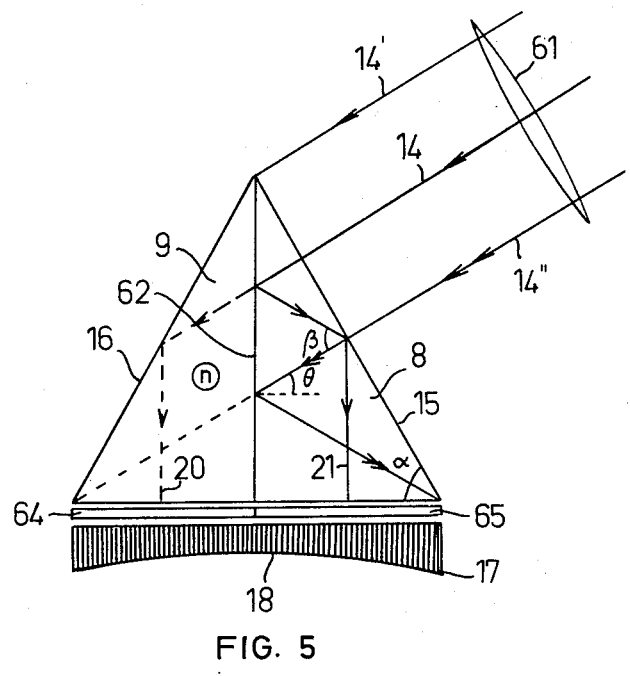
Figure 6:
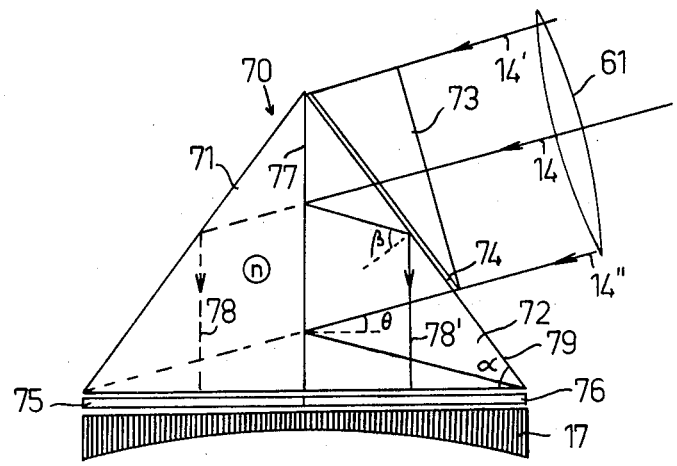
Figure 7:
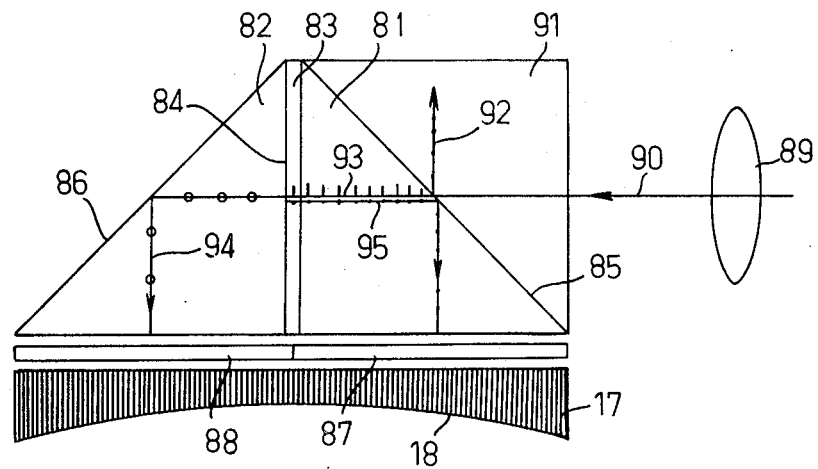
Figure 8:
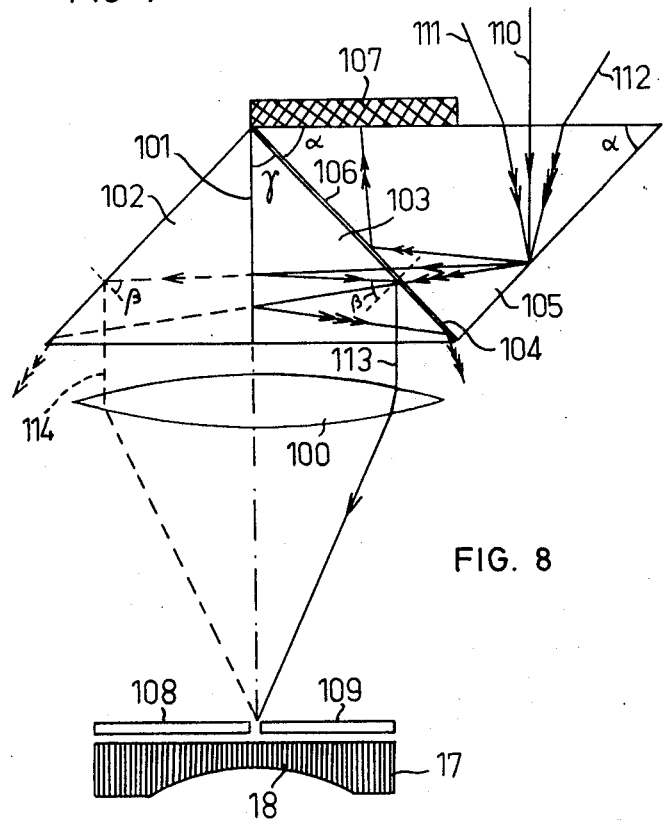
Figure 9:
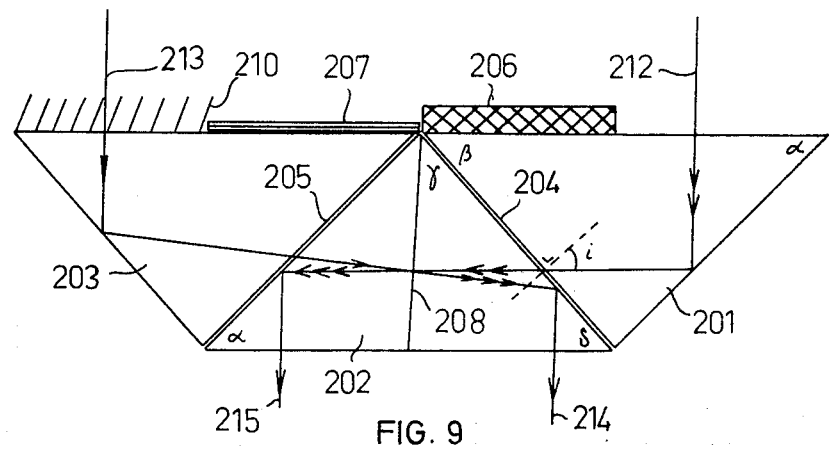
Figure 10:
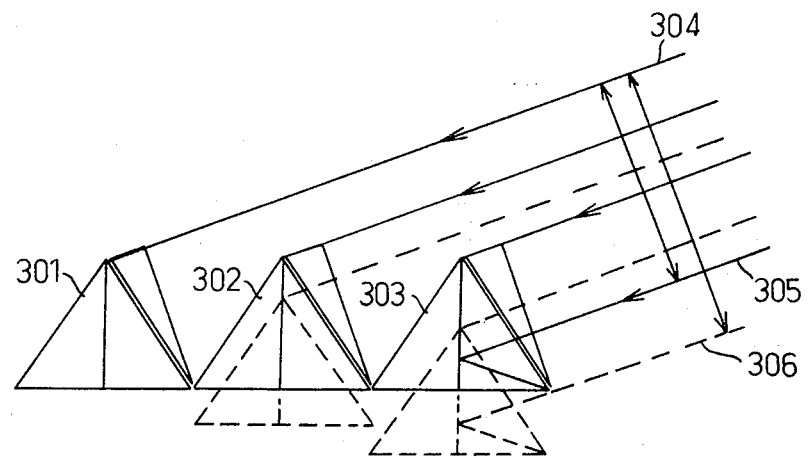
Figure 11:
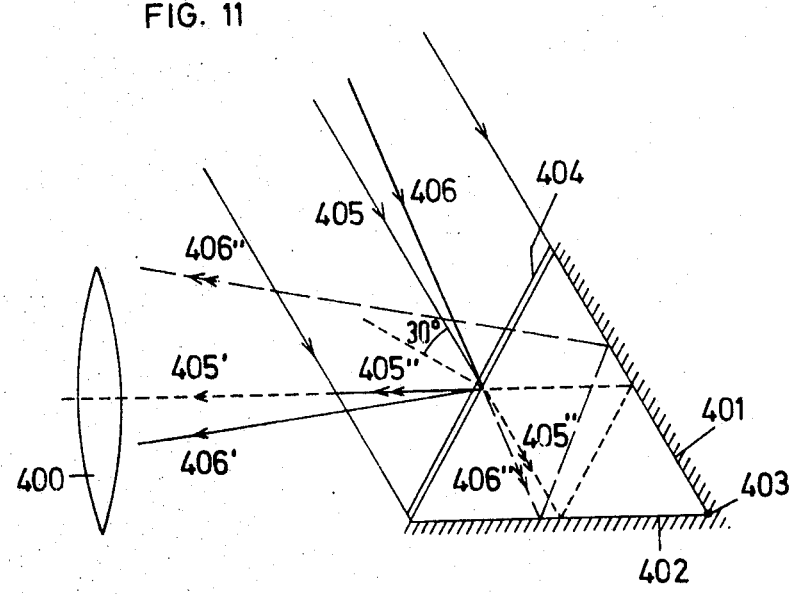
Figure 12:
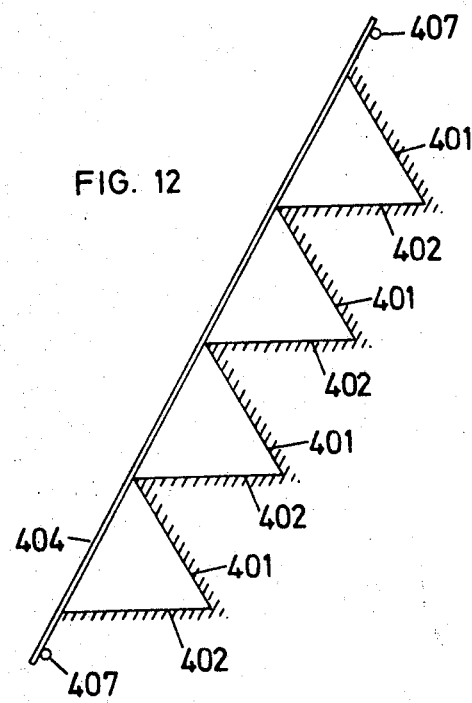

FIGS. 5, 6 and 7 each show a different embodiment of such a colour splitting system;

FIG. 8 shows a colour splitting system disposed in front of the object lens;

FIG. 9 shows another example of a colour splitting system which will be used in front of the object lens;

FIG. 10 shows an arrangement of colour splitting systems which can be used in front of the object lens;

FIG. 11 shows another embodiment of a colour splitting system disposed in front of the object lens;

FIG. 12 shows an arrangement including colour splitting systems as shown in FIG. 11.

Figure 1:
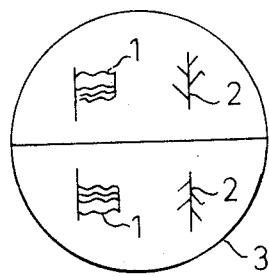

FIG. 1 illustrates a case in which the radiation spectrum from a scene consisting of a flag 1 and a tree 2 is split into two different wavelength regions (colours), which are depicted in side-by-side relationship, i.e., spatially separated on one photocathode 3 of an image intensifier tube.

In order to prevent that later, when these separate images are superimposed, poor registry is achieved owing to annoying distortion, the images are disposed mirror-symmetrically relatively to a plane containing the electro-optical axis of photocathode 3, as a result of which rotation-symmetrical distortion does not affect image registry.

Figure 2:
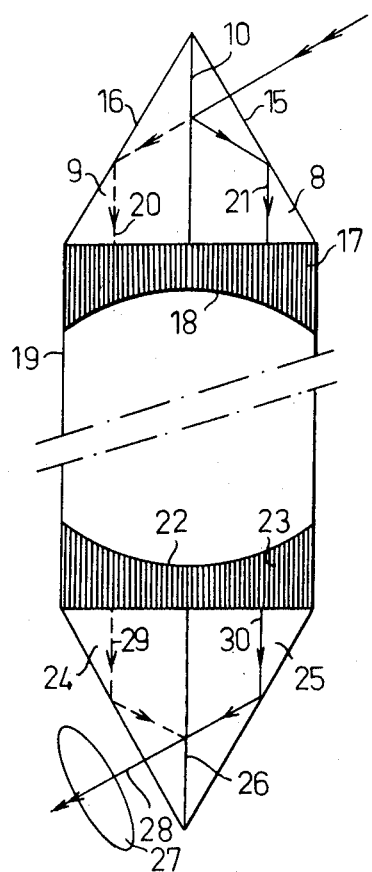
FIG. 2 shows a first embodiment of apparatus according to the present invention.

The actual splitting and re-combination of the image can be achieved by means of a system, one embodiment of which is shown, by way of example, in FIG. 2.

In the system shown in FIG. 2, use is made of two right-angled prisms 8 and 9, cemented together along the greater perpendicular sides to form a block whose cross-section is an equilateral triangle.

One of the greater perpendicular sides is in this case provided with a dielectric layer or metallic mirror 10 (not shown), by which an incident light beam is split into colours.

In this case the angle of incidence of the principal ray (14), i.e. the axis of the beam emanating from the scene to be depicted through an object lens not shown, on dielectric layer 10 is 30°, and after being split the principal ray falls on the hypotenuses 15, 16 at an angle of total reflection of 60°.

Rays 20 and 21 are subsequently directed through a conventional optical fibre plate 17 on to the photocathode of image intensifier tube 19 known per se and shown diagrammatically.

The light spectrum presented is thus divided in two via the dielectric layer (mirror) and results in two spatially separated images on cathode 18, which is shown diagrammatically by two rays, 20, 21, one of which is composed of light of a given wavelength range and the other of light of a given different wavelength range.

The division can be selected, for example, at about 750 nm, so that one image is composed of light having wavelengths less than 750 nm and the other of light having wavelengths in excess of 750 nm.

It is noted that when ¼λ-layers are used for the colour splitting layer an additional division may occur at a different wavelength, owing to the transmission characteristics thereof. Thus one image may be composed of transmitted light with wavelengths longer than, e.g., 650 nm and shorter than 500 nm, and the other of light having wavelengths of between 500 and 650 nm. In practice this situation may give extra advantages. For example, the paint of a vehicle may be attuned to the spectrum of leaves near 650 nm. In that case division at 650 nm would not be successful. If there is no such adaptation near 500 nm, however, a good distinction can still be made.

The radiation forming the images and thus falling on to photocathode 18 liberates electrons from the electron-emitting layer of said cathode, which electrons are focussed on the anode of the image intensifier tube by known per se means not shown.

Finally, in a manner known per se, separate, spaced, intensified images are formed from the separate images on photocathode 18 on the anode 22 of the image intensifier tube, if one image intensifier tube is used, or of the last image intensifier tube, if a plurality of image intensifier tubes are used in series.

In this case, see FIG. 2, the radiation emitted by anode 22 is passed via a conventional optical fibre plate 23 through a prism system identical to that described hereinbefore, and consisting of two right-angled prisms 24 and 25, which are cemented together and comprise a dielectric layer 26 between them. By means of a lens system, shown diagrammatically at 27, the separate, spaced images on anode 22 can then be viewed. As shown, principal ray 28 running through the lens system is composed of two rays 29 and 30, each emanating from one of the images on anode 22.

In order that the images on anode 22 may each be given a colour of their own, anode 22 may be built up from phosphors luminescing in different colours, and on each of which one of the separate images on photocathode 18 is depicted. It is also possible to make the anode with a so-called white phosphor and to view the separate images through their own colour filters. These filters may be provided direct on anode 22 or between optical fibre plate 23 and prism system 24, 25.

When, in the case shown in FIG. 2, one half of the anode consists of a phosphor luminescing in green and the other half of one luminescing in red, a very clear contrast can be obtained. The same applies when use is made of a red filter and a green filter.

Figure 3:
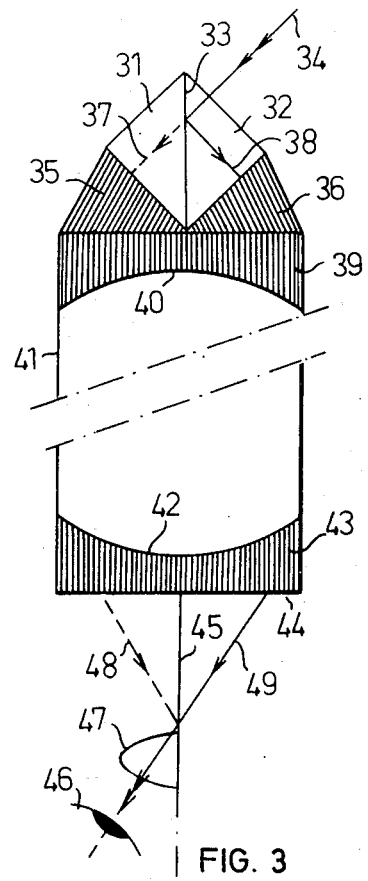
FIG. 3 shows a further embodiment of such apparatus.

A further embodiment of a system for splitting and re-combining the radiation from a scene is shown in FIG. 3.

In it, two prisms 31, 32 in the form of isosceles right-angled triangles have the respective bases cemented together, one of the bases being provided with a dielectric layer or mirror 33, not shown, by which an incident light beam is split into colours.

The angle of incidence of principal ray 34 on reflecting surfaces 33 is 45°. In this case additional reflection is not necessary, but wedge-shaped fibre plates 35 and 36 are provided to form images on photocathode 40 of an image intensifier tube 41 from separate beams 37, 38 through a conventional fibre plate 39.

After intensification of the electron beam emitted by the photocathode in one or a plurality of image intensifiers, corresponding images are formed on the last anode 42, which is provided with phosphor, so that two light images are formed, which through a conventional fibre plate 43 are visible on surface 44.

Subsequently these two images are combined into superimposition with a colour splitting system. In the case shown, this second colour splitting system just comprises a dielectric layer or metallic mirror 45 provided vertically on surface 44. The eye will perceive the two separately formed images as one image through half-lens 47. For the light from one image, symbolically indicated with principal ray 48, is fully reflected by mirror 45, whereas the light indicated with principal ray 49 will pass through the mirror. The eye will thus perceive one image of the scene, i.e. one in which all details will be visible in the colour with which anode will be covered.

Various possible colour splitting systems will be described in some detail hereinafter. Although some embodiments are described above, the number of possibilities is by no means exhausted. However, although additional examples of such systems are given hereinafter, it should be noted that the invention should not be construed as being limited to the colour splitting systems described herein.

Figure 4:
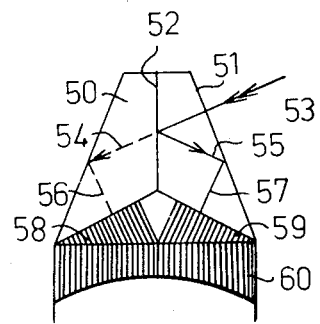
FIG. 4 shows one embodiment of a colour-splitting prism system which can be used in the apparatus of the present invention.

FIG. 4 diagrammatically shows a system which will be attractive in particular in cases in which colour shifts resulting from polarisation prove to be annoying, by virtue of the fact that the angle of incidence on the reflecting surface may be kept small.

Two quadrilateral prisms, designated 50 and 51, have two corresponding sides cemented together. One of these sides is provided with a dielectric layer or metallic mirror, designated 52. The principal ray 53, i.e., the axis of the beam from the scene not shown, is split by mirror 52 into rays 54 and 55, which after full reflection, as rays 56, 57, respectively, through wedge-shaped fibre plates 58 and 59 and through a conventional fibre plate 60, symbolically form the separate images on the photo-cathode not shown.

FIG. 5 shows a colour system identical to FIG. 2, corresponding parts being designated by identical reference numerals. In this figure, 61 designates an object lens, by means of which the beam from the scene (not shown) is depicted on photocathode 18. The beam posterior to lens 61 is bounded by rays 14' and 14'', and is further represented by principal ray 14.

As stated in conjunction with FIG. 2, the composite prism forms an equilateral triangle, the angles $\alpha$ of which are 60°, the angle of incidence $\theta$ of the beam represented by ray 14'' on surface 62 being 30°. After the splitting of the beam on this surface 62, reflection occurs on sides 15, 16 of the composite prism. The angle at which principal ray 14, reflected by surface 62, i.e., after reflection ray 21, impinges on side 15 is indicated by $\beta$ and is 60°, i.e. it is greater than the boundary angle (the index of refraction of the material of the prism is $n = 1.52$), so that there is total reflection.

Surface 62 need not necessarily be provided with a dielectric layer. In the case shown, it is supposed that this surface is provided with a "semi-permeable" metal or with strips, so that half the impinging beam is reflected on to side 15 and the other half on to side 16. The splitting according to wavelengths is accomplished using filters 64, 65 arranged between the prism and cathode fibre plate 17 (or anode fibre plate, if the system is used for re-combining separate images.)

As stated above, a small angle of incidence on the reflecting surface is desirable in cases in which colour shifts due to polarisation prove to be annoying.

A colour splitting system in which the angle of incidence is reduced to 15° is illustrated in FIG. 6.

In this figure, the prism is built up from two right-angled triangles 71 and 72, made of a material having an index of refraction $n$, and an additional prism 73, so that the whole acts as a plane parallel plate. For the reflected ray, there should be an air gap 74 between the additional prism 73 and triangle 72 in view of the desired total reflection.

As in the other examples described hereinbefore, the two right-angled prisms 71 and 72 are cemented together along their greater perpendicular sides, one of the surfaces being provided with either a dielectric layer or a "semi-permeable" metal, or strips, in which latter two cases filters 75 and 76 are necessary.

The acute angle opposite to surface 77 of the right-angled triangles 71 and 72, designated $\alpha$ for triangle 72, is in this case 52.5°. The angle of incidence of beam 14', 14, 14'' after passing object lens 61, designated $\beta$ for ray 14'', is now 15°, while the angle of reflection of rays 78 and 78', split from principal ray 14, on surface 79 is 52.5°, and so is greater than the boundary angle (index of refraction $n = 1.64$), so that complete reflection is achieved.

Preferably the index of refraction $n$ and the angle of incidence are so selected that $$n \sin\theta \leq 0.5$$

to avoid colour shifts at various angles of incidence and due to polarisation.

FIG. 7 shows still another variant of a colour splitting system, in which a ¼λ plate 83 is provided in front of reflecting surface 84. Furthermore, reflecting surfaces 85 and 86 are shown, as well as colour filters 87 and 88, which are provided in front of fibre plate 17 and photocathode 18.

This system operates as follows: The beam represented by principal ray 90 from the scene not shown passes object lens 89 and is split on surface 85 between prism 81 and an additional prism 91 into a ray 92, polarised perpendicular to the plane of drawing, which does not contribute to the ultimate image formation, and a parallel-polarised ray 93. A portion 94 of the latter ray passes through reflecting surface 84, whereas the remaining portion 95 is reflected. This latter portion passes plate 83 twice, as a result of which its direction of polarisation is rotated through 90°.

If desired, prisms 81 and 82 may be omitted, in which case surfaces 84, 85, 86 are formed as mirrors on thin glass plates or films.

All systems described with reference to FIGS. 5 – 7 can also be used posterior to the last anode for effecting superimposition of the separate images. It will be clear that the light path will then be reversed and that the object lens referred to will perform the function of a magnifying lens.

The colour splitting system can also be positioned in front of, rather than posterior to, the object lens. Its operation is then such that the whole field in one colour is depicted on the entire cathode and the whole field in the other colour is also depicted on the entire cathode, but in mirror image relative to the dielectric reflecting layer or metallic mirror.

Using two filters, each covering half of the cathode, it is achieved that an image of the same half of the scene is formed twice on the cathode, the two images being the mirror image of each other and covering the entire cathode.

By a proper selection of glass, if at least prisms are used for the colour splitting system, and angle, it can be achieved that the undesirable half of the field of view is slightly weakened, owing to the fact that the very middle of the field of view corresponds with an angle of incidence equal to the boundary angle for total reflection.

The advantages of having first colour splitting and then the object lens are:

any object lens can be used; a special one corrected for the glass path of the prism system is not necessary;

the angle of incidence on the dielectric layer varies only half the field angle (parallel beams), the aperture angle does not come in addition; as a consequence, "dispersion" is limited.

translation of the prisms is permitted, provided the reflecting layer is moved parallel to itself.

This makes adaptation of existing passive viewers possible.

FIG. 8 shows an arrangement of a colour splitting system in front of an object lens 100.

A colour splitting layer 101 is provided between two right-angled prisms 102, 103, cemented together along their greater rectangular sides. The apex angle $\gamma$ of these prisms is, for example, 44°. In front of this prism system, but leaving an air gap 104, there is provided an additional prism 105 in the form of an isosceles triangle with a base angle of, for example 46°, such that the surfaces, such as surface 106 of prism 105 both form the boundary with a layer of air. Furthermore the base of prism 105 is in part provided with an absorbing layer 107 in order that the interfering half of the field of view of this system may be eliminated. Via the object lens 100, each separate image is depicted on the entire photocathode 18 via a conventional fibre plate 17. Using two filters 108 and 109, which each cover half of the cathode, it is achieved that two images of the same half of the field of view of the system are depicted, each being the mirror image of the other.

The colour splitting layer 101 between prisms 102 and 103 is impinged upon by principal ray 110 at an angle of incidence of 2° in this case, in which prism 105 has two equal base angles of 46°, and the apex angle of right-angled prism 103 is 44°.

Principal ray 110 passes air gap 104 between prisms 103 and 105 at an angle just equal to, or slightly less than, the boundary angle in this case, so the index of refraction $n = 1.4945$. After the passage of, and reflection by, rereflecting layer 101, the inclined sides of prisms 102, 103 are impinged upon at an angle $\beta$ so that total reflection occurs and light rays 113 and 114 continue parallel to the original direction of principal ray 110.

Rays such as ray 111 are fully reflected by the inclined side 106 of prism 105 and subsequently absorbed in 107.

Rays such as ray 112 are not reflected by the inclined side 106, but pass air gap 104 and are, indeed, the rays used.

FIG. 9 shows still another embodiment of a colour splitting system placed in front of the object lens not shown.

This system is built up from three triangular prisms 201, 202, and 203, with air gaps 204 and 205 between them. The base of triangle 201 is provided with an absorbing layer 206. Provided in the middle of prism 202 is the actual colour splitting layer 208.

As there is no object lens between the scene, not shown, and the input end of the colour splitting system, as shown the upper end, the undesirable half of the field angle of the system must be suppressed in this case, too, for which purpose, in addition to absorbing layer 206, parallel strips 210 are used.

This system has two inputs, and the colour splitting layer 208 is used on both sides, namely, on the right (as viewed in the drawing) by the light, principal ray 212, entering at prism 201, and on the left by the light, principal ray 213, entering at prism 203. After being split, these rays emerge from the system as parallel rays 214 and 215.

If, as shown, the base angles of prism 201 are designated $\alpha$ and $\beta$, those of prism 202 $\alpha$ and $\delta$, the angle between reflecting layer 208 and air gap 204 $\gamma$, the angle of incidence of the principal rays impinging on the reflecting layer $\theta$, and the angle with the normal in glass at which the air gap is passed $i$, the following equations apply:

$$\theta = \beta - \gamma$$

$$i = 180° - 2\alpha - \beta$$

$$2\alpha = 180° + \theta - \beta - \gamma$$

In a practical example, the following values can be used:

$$\alpha = 45°$$

$$\beta = 48°$$

$$\gamma = 45°$$

$$\delta = 48°$$

and for the index of refraction of the glass $n = 1.4945$.

In this case, $\theta$ is only 3°, and the colour splitting layer will not be perpendicular to the plane of entry.

If the object lens is placed posterior to the colour splitting system, this system must be as large as the object lens, or must have the same diameter, which may be objectionable. A solution for this specific problem can be obtained, however, by means of an arrangement as shown diagrammatically in FIG. 10.

In the embodiment shown in this figure, three colour-splitting systems 301, 302 and 303 are used side by side. In this case, the beam received from a scene not shown is bounded by rays 304 and 305. The beam can be enlarged still further by moving the systems vertically relatively to each other, as shown in ghost outline. In that case the beam is bounded by rays 304 and 306.

FIG. 11 shows a preferred embodiment of colour splitting system, which is particularly suitable for use in the apparatus according to the present invention, and should be placed in front of object lens 400. This colour splitting system comprises two plane mirrors 401 and 402, for example, aluminum or silver mirrors, placed at an angle of 60° to each other and touching along line 403. A colour splitting layer 404, for example, a dielectric mirror layer, or ¼λ layers, is provided at an angle of 60° to mirror 402, so that the whole forms an equilateral triangle in cross-section. Lens 400 is placed so that the angle of incidence of principal ray 405 of the beam from the scene to be depicted relative to the normal to the dielectric layer 404 is 30°. Thus both the reflected component 405' and the transmitted component 405", after reflection by mirrors 401 and 402, will emerge along the axis of lens 400. Means, such as a diaphragm, are provided to ensure that rays from the scene to be depicted making an angle less than 30° with the normal to dielectric layer 404 are not admitted to lens 400, or are removed from the apparatus beforehand. Lens 400 has a small field angle. A beam 406 making an angle a little more than 30° with the normal is split into a reflected component 406' with radiation from a first wavelength region and a transmitted component 406" with radiation from (a) second wavelength region(s), and these components are spatially separated. As appears from FIG. 11, the reflected components of this beam will always be focussed below the principal axis of lens 400, whereas the transmitted components will always be focussed above the principal axis. Thus the same situation will arise as shown in the preceding figures. The colour-splitting system shown in FIG. 11 has various advantages. As incidence on layer 404 is from air ($n \approx 1$) and, as stated, lens 400 has a small angle of field, the condition $n.\sin \theta \leq 0.5$ will reasonably be satisfied, so that even without extra aids, at a relatively large angle of incidence ($\theta \approx 30°$) the shift occurring between the transmission characteristics of layer 404 for parallel-polarised light and those for perpendicular-polarised light (transmission plotted against wavelength) will be limited to an extent that is acceptable for all practical purposes. Another advantage of this colour-splitting system is that, by reason of its simplicity, it lends itself well for an arrangement as shown in FIG. 12, in which 401 and 402 designate mirrors adjusted on a base plate, 407 stops, and 404 a loose dielectric mirror. When dielectric mirror 404 rests against stops 407, a multiple of the colour splitting systems of FIG. 11 is obtained. If desired, mirror 404 can easily be replaced by one effecting colour splitting at a different wavelength region. It will be clear that the arrangement of FIG. 10 can also easily be realized. Still another advantage of the system of FIG. 11 is that for an angle of incidence greater than, or equal to, 30°, the number of reflections of the reflected ray 406' differs by an odd number, namely, one, from that of transmitted ray 406", so that the desired mirror symmetry can be obtained.

The systems described above also lend themselves excellently for being built into a microscope, which makes it possible to enlarge the contrasts in the scene to be observed and thus to increase the power of perception.

It will further be clear that the invention is not limited to the embodiments described. Numerous changes and modifications will readily occur to those skilled in the art without departing from the scope of the invention as defined in the appended claims.

I claim:

1. A method of forming a colour image comprising the steps of splitting a radiation spectrum from a scene into at least one first wavelength region and at least one second wavelength region, forming on a cathode of an image intensifier tube images of the scene from the radiation of said first and second wavelength regions so that said images are spatially separated; intensifying the cathode images by means of at least one intensifier tube one of said intensified images being visible in a radiation spectrum different than said other intensified image; and effecting superimposition of the thus produced intensified separate images.

2. A method according to claim 1, wherein the different images are spatially separated so that they come to lie on the cathode and anode symmetrically around the electro-optical axis of said intensifier tube.

3. A method according to claim 1 wherein each separate image is rendered visible on the last anode in a colour different from that of the other image.

4. A method according to claim 1 wherein the radiation emanating from the separate images on the anode of the last image intensifier tube, is passed through different colour filters, and that the superimposed image is formed from the radiation passed through the filters.

5. A method according to claim 1 wherein the radiation spectrum is split at a wavelength of approximately 750 nm.

6. A method according to claim 1, wherein the different images are spatially separated so that they come to lie on the cathode and anode symmetrically relative to a plane containing the electro-optical axis of said intensifier tube.

7. Apparatus for colour image formation, comprising a colour splitting system for splitting the radiation spectrum from a scene into at least one first wavelength region and at least one second wavelength region so as to form in a plane spatially separate images of the scene from the radiation of said first and second wavelength regions; at least one image intensifier tube comprising a cathode and an anode, said cathode, being disposed so that its surface coincides with said plane; means for making one intensified image visible in a colour different from that of the other intensified images; and means posterior to said anode for effecting superimposition of the individual images to form an image.

8. Apparatus for colour image formation according to claim 7, and further comprising means for forming the separate images on the cathode symmetrically around the electro-optical axis.

9. Apparatus for colour image formation according to claim 7 wherein said anode includes two sectors each provided with a phosphor emitting a different colour.

10. Apparatus for colour image formation according to claim 7 wherein said anode is provided with a monochromatic phosphor and two colour filters arranged so that the separate images can be perceived through their own colour filter.

11. Apparatus for colour image formation according to claim 7 wherein said colour splitting system includes a dielectric mirror layer.

12. Apparatus for colour image formation according to claim 7 wherein said colour splitting system is comprised of equilateral triangular cross-section consisting of two right-angled prisms, one of said prisms being provided on the greater perpendicular side with a dielectric layer, said prisms being connected together along their respective greater perpendicular sides.

13. Apparatus for colour image formation according to claim 7 and additionally comprising a second colour splitting system for combining the separate images.

14. Apparatus for colour image formation according to claim 7 wherein said colour splitting system comprises two plane mirrors disposed at an angle of 60° to each other and touching each other along a line, there being provided a colour splitting layer at an angle of 60° to each said mirrors so that the whole forms an equilateral triangle in cross-section.

* * * * *